United States Patent [19]

Shibayama et al.

[11] Patent Number: 4,972,214
[45] Date of Patent: Nov. 20, 1990

[54] CAMERA

[75] Inventors: Yoshinobu Shibayama, Kanagawa; Toyotoshi Suzuki, Tokyo, both of Japan

[73] Assignee: Canon Kabushiki Kaisha, Tokyo, Japan

[21] Appl. No.: 449,048

[22] Filed: Dec. 14, 1989

Related U.S. Application Data

[63] Continuation of Ser. No. 358,462, May 30, 1989, abandoned, which is a continuation of Ser. No. 289,454, Dec. 22, 1988, abandoned, which is a continuation of Ser. No. 94,893, Sep. 10, 1987, abandoned.

[30] Foreign Application Priority Data

Sep. 20, 1986 [JP] Japan ................... 62-22707

[51] Int. Cl.$^5$ .............................. G03B 1/12
[52] U.S. Cl. .................................. 364/173.1
[58] Field of Search .................. 354/173.1, 173.11

[56] References Cited

U.S. PATENT DOCUMENTS

| | | | |
|---|---|---|---|
| 3,519,340 | 7/1970 | Vockenhuber et al. | 352/72 |
| 4,460,256 | 7/1984 | Araki et al. | 354/173.11 |
| 4,504,131 | 3/1985 | Kimura | 354/173.1 |
| 4,506,965 | 3/1985 | Kitajima et al. | 354/173.1 |
| 4,632,530 | 12/1986 | Iwata et al. | 354/173.11 |

FOREIGN PATENT DOCUMENTS

| | | |
|---|---|---|
| 115816 | 9/1975 | Japan . |
| 68220 | 6/1978 | Japan . |
| 26722 | 2/1979 | Japan . |
| 26723 | 2/1979 | Japan . |
| 26724 | 2/1979 | Japan . |
| 26725 | 2/1979 | Japan . |
| 143550 | 11/1980 | Japan . |
| 201221 | 12/1982 | Japan . |

Primary Examiner—Michael L. Gellner
Attorney, Agent, or Firm—Fitzpatrick, Cella, Harper & Scinto

[57] ABSTRACT

A device for determining whether a film leader is inside or outside a camera housing includes a light emitting device, a light detection device, and a control circuit. The light emitting device is disposed on one side of the film and emits signal light. The light detection device is disposed on the same side of the film and detects when the signal light is blocked by two separate portions of the film. The light detection device also detects when the signal light is not blocked by the two film portions. The two film portions are separated from each other by predetermined distance. The control means emits a control signal when the light detection device detects the signal light, thus indicating that the film leader is inside the camera housing.

14 Claims, 6 Drawing Sheets

CAMERA

This application is a continuation of application Ser. No. 358,462 filed May 30, 1989, which is a continuation of Ser. No. 289,454, filed Dec. 22, 1988, which is a continuation of Ser. No. 094,893, filed Sept. 10, 1987, all three applications now abandoned.

BACKGROUND OF THE INVENTION

1. Field of the Invention:

This invention relates to cameras, and more particularly to cameras capable of quick and easy loading of film.

2. Description of the Related Art:

In the cameras using cartridge film, loading of the film was considerably troublesome. To improve this, in recent years, there have been made various proposals for a camera capable of simply loading film. One of the proposals of this sort is to form the back side of the camera housing with a small back lid for the cartridge chamber. Without the necessity of preliminary adjustment of the length of the tongue of film, the cartridge is set in the chamber and, upon closing the back lid, an automatic operation takes place so that, after a part of the tongue which is jutting out of the back lid has once been pulled in the interior of the camera housing, the leader of the film is fed to the takeup spool chamber, as disclosed in U.S. patent applications Ser. Nos. 026,267 filed Mar. 16, 1987 and 036,719 filed Apr. 10, 1987, both assigned to the assignee of the present invention. For the cameras of these applications however, the film in the cartridge chamber is first rewound in response to closure of the back lid to insert the jutting-out end portion of the leader of film into the interior of the camera housing. After the leader is fully stored inside the camera housing, but before it disappears in the casing of the cartridge, the motor is reversed in the direction of rotation to feed the film, toward the spool chamber. In other words, to transport the film leader in the winding-up direction, means must be provided for detecting that the leader of the film has just entered the interior of the camera housing as the rewinding of the film is performed.

As such detecting means, use has so far been made of mechanical means, or a contact switch co-operating with the film. However, this switch had drawbacks in that its operation was unstable, and that its paired contact members, when brought in contact, were apt to present a sufficient electrical conduction therebetween. Hence it became a cause of faulty operations of the camera.

Then, as a method that eliminates such drawbacks, it may be considered to use optical detecting means such as a photointerrupter instead of the above-described contact switch so that the switching operation can be carried out in non-contact fashion with respect to the film.

This method is explained in more detail below by reference to FIGS. 7 and 8. A light-emitter A and a light sensor B are positioned near the mouth of the cartridge in alignment with each other and on opposite sides of the film F. The light-emitter A starts to emit light at the same time the automatic loading operation is initiated by moving, the film F in the direction of arrow Y in FIG. 7 to insert the film leader from the outside of the camera housing into the interior of the camera housing. In the early stage, because the film F intervenes between the emitter A and the sensor B, the light issuing from the emitter A does not reach the sensor B. This implies that the leader of film F is not fully pulled in yet. As the rewinding goes on, when the free end of the film F gets off the light path, the light from the emitter A strikes the sensor B. Thus, it is determined that the intruding of the film leader into the interior of the camera housing has just been completed. Then, the direction of rotation of the motor is reversed and the film F is advanced in the winding-up direction (toward the spool chamber).

The employment of such a conventional light arrangement, however, gives rise to a new drawback as is described below. For discriminating among films at the time of development, it is usual that the film F has a plurality of penetration holes F1 bored in an area near the root of the leader. If it happens, at a time during the rewinding operation in the automatic loading mode, that one of the aforesaid holes F1 moves into the light path, the impingement of the light from the emitter A on the sensor B will be mistaken for the passage of the free end of the film F off the light path. Although the free end of the film F is, in fact, left jutting out, the motor is caused to reverse its direction of rotation so that the film leader is pushed back out of the camera housing. Thus, it becomes impossible to rely on the automatic means when loading the camera with film.

SUMMARY OF THE INVENTION

With the foregoing in mind, the present invention has been made. In a camera in which, after film has been loaded in a cartridge chamber and the cartridge chamber is closed with the leader of the film left outside the camera housing, and in which the aforesaid film leader is inserted into the camera housing and the film is then wound onto a spool, a detecting means for determining when the film leader is inserted into the camera housing is an optically operated detecting means. Thus, the drawbacks resulting from the use of mechanical means or a contact switch are eliminated, while nevertheless preventing the operation of the aforesaid optically operated detecting means from being affected by the penetration holes bored near the root of the film leader.

To achieve this, the present invention provides for a camera of the kind described above with pull-in means for inserting a leader of loaded film which has been left to jut out of the camera housing into the camera housing. Optically operated detecting means are arranged so that when the aforesaid film leader is not fully inserted into the camera housing, the film blocks the light path at at least two points. And, upon detection of removal of the film blocking the light path, the detecting means determines when the inserting of the film leader is completed. Winding means are disposed for winding the film onto a spool in response to the detection by the optically operated detecting means of the completion of the inserting of the film leader into the camera housing.

Other objects of the invention will become apparent from the following description of embodiments thereof.

DETAILED DESCRIPTION OF THE PREFERRED EMBODIMENTS

Figure 1:
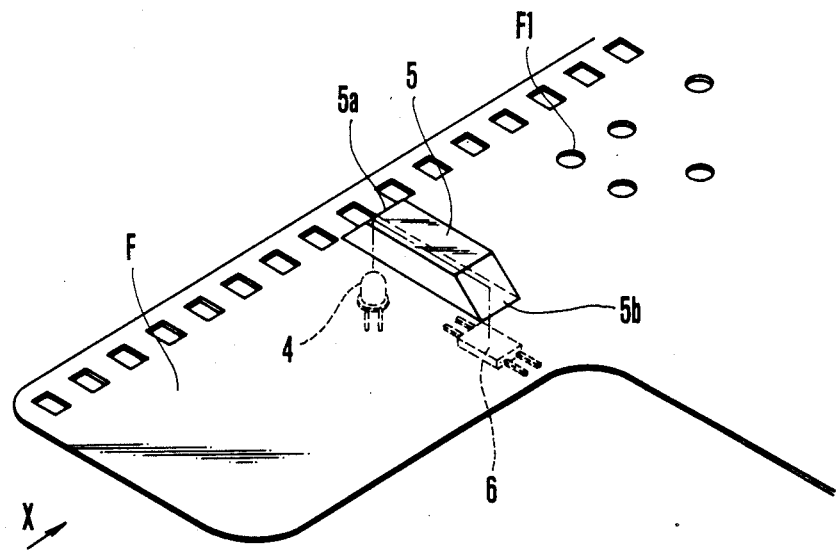
FIG. 1 is a perspective view of the light arrangement of an embodiment of a device for detecting the free end of the film according to the present invention.
Figure 2:
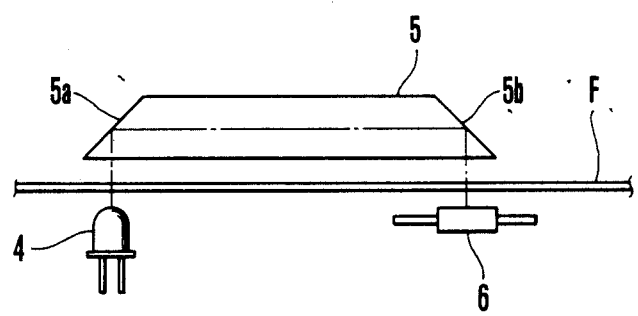
FIG. 2 is a side elevational view viewed from the direction X of the device of FIG. 1.
Figure 5:
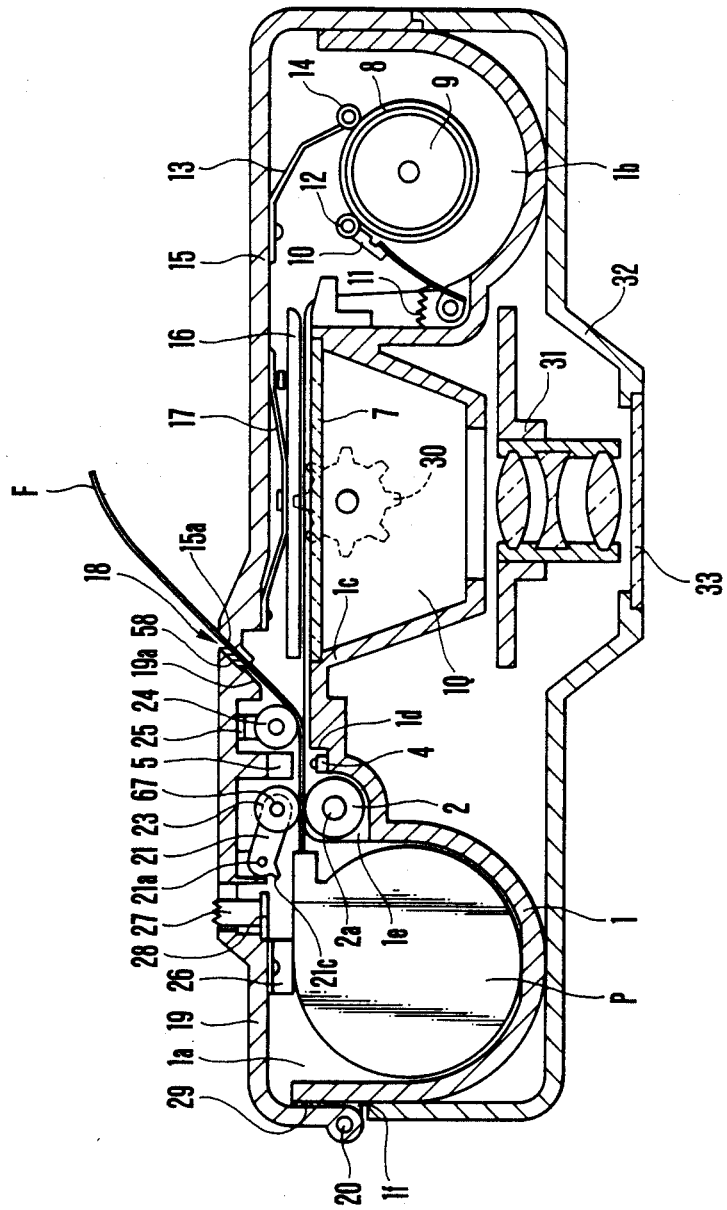
FIG. 5 is a horizontal section view of the camera of FIG. 4.

An embodiment of the invention is described by reference to the drawings. FIG. 5 is a horizontal cross-section view illustrating a camera according to the invention. The camera has a framework 1 in which are formed a cartridge chamber 1a, a spool chamber 1b, an aperture 1Q, an aperture cover receptor 1c, a feed roller receptor 1e, a back lid hinge base 1f, and others. A film feed roller 2 is rotatably mounted on a shaft 2a and its surface is coated with a soft material such as rubber. A light emitting element 4 is mounted on a stepped-down portion 1d of the framework 1. A light guide 5 is in such a form that its side walls are almost trapezoid and has first and second reflection surface 5a and 5b (FIG. 1) by which the optical axis is bent in a "U" shape. This light guide 5 is mounted on the inner surface of a back lid 19 and so oriented that the first reflection surface 5a is opposed to the light emitting element 4 when the back lid 19 is closed. A photosensitive element 6 (FIG. 1) receives the light issuing from the light emitting element 4 and passing through the light guide 5. This photosensitive element 6 is mounted on the stepped-down portion 1d at a prescribed distance from the light emitting element 4 in the lateral direction of the film F, comprising the optically operated detecting means together with the light emitting element 4 and the light guide 5. An aperture cover 7 made of glass or other transparent material is fitted over the opening portion of the aperture 1Q and fixedly secured to the aperture cover receptor 1c. A spool 8 whose outer peripheral surface is coated with a rubber layer or the like is capable of taking up the fed film F. An electric motor 9 is installed within the spool 8. A framework roller plate 10 is pivotally mounted on the framework 1 and urged by a spring 11 so that a rotatable roller 12 is pressed on the spool 8. A back lid roller plate 13 is made of resilient material in the form of a thin plate and fixedly mounted on a rear cover 15 in such a manner that its own elastic force brings a rotatable roller 14 on its free end into contact on the spool 8.

Figure 3:
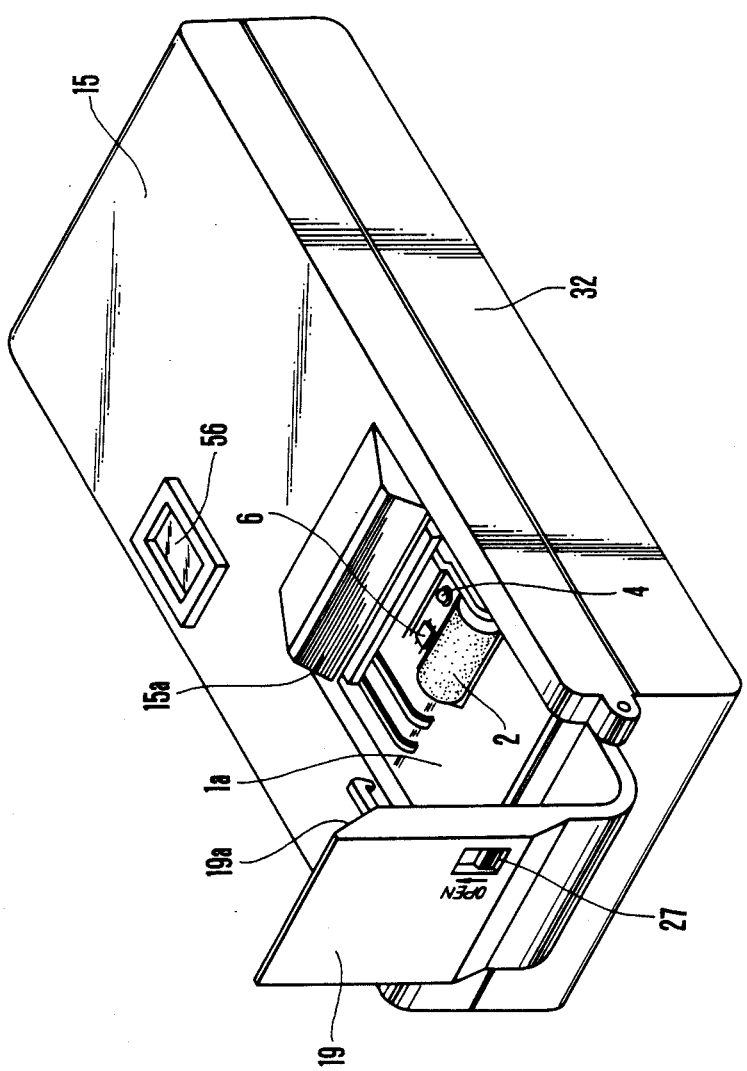
FIG. 3 is a perspective view of a camera employing an embodiment of the invention with the back lid of the cartridge chamber opened.

The rear cover 15 has, as shown in FIG. 3, a small opening of rectangular shape to expose only the cartridge chamber 1a, comprising an integral housing of the camera together with a front cover 32. Formed in proximity to the inner one of the side edges of the aforesaid opening is a tapered surface 15a. When the back lid 19 is closed, a film admission passage 18 (FIG. 5) is formed between the tapered surface 15a and an engagement surface 19a of the back lid 19. The aforesaid back lid 19 fits over the aforesaid opening, and is hinged by a shaft 20 (FIG. 5) on the back lid hinge base 1f of the framework 1. Also, that engagement surface 19a of the back lid 19 which engages with the inner side edge of the opening of the rear cover 15 is made to incline at the same angle as that of inclination of the tapered surface 15a. A light shielding member 58 of Moltprene (soft polyurethane foam) or like soft material is adhered over the aforesaid engagement surface 19a to prevent leakage of light from the film admission passage 18 into the interior of the camera, when the back lid 19 is closed as shown in FIG. 5, since, in this closed position, the light shielding member 58 is pressed against one surface of the film F in the film admission passage 18.

Figure 4:
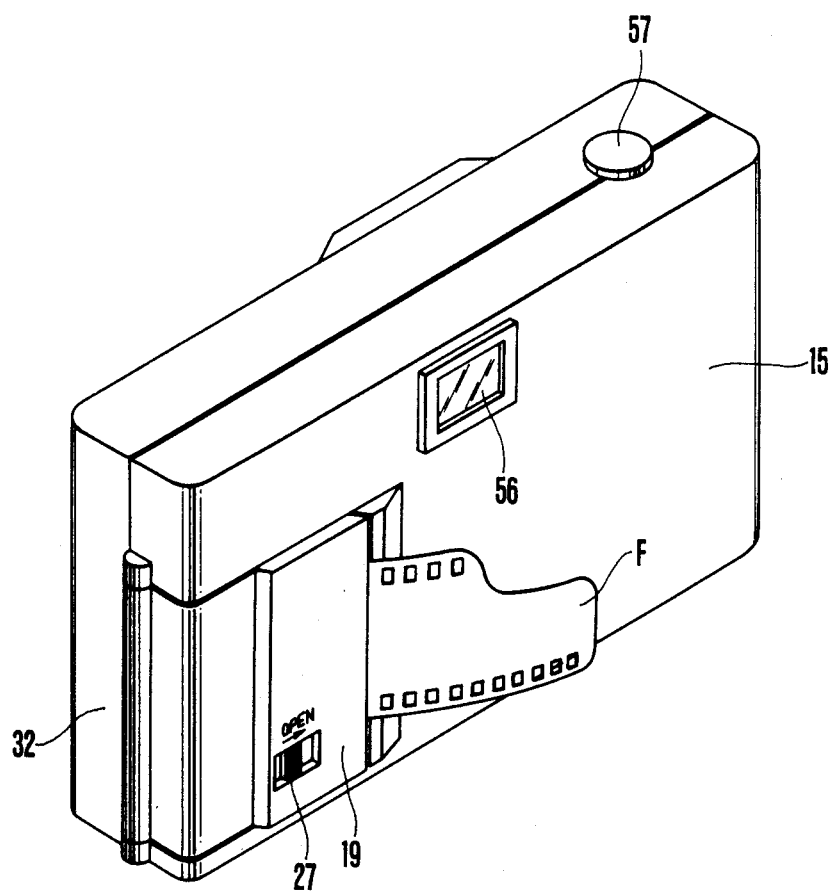
FIG. 4 is similar to FIG. 3 except that the back lid is closed just after the film has been loaded.

A protection glass 33 is fixedly fitted in a front opening of the front cover 32, as shown in FIG. 5. A front plate unit 31 holds a photographic lens. A pressure plate 16 guides the film F passing on the aperture cover 7 and, at the same time, urges that film F toward the front of the camera. A pressure plate spring 17 is fixedly mounted on the rear cover 15 and urges the pressure plate 16 toward the front of the camera. A roller plate 21 rotatably supports a first back lid roller 23. This roller plate 21 is pivotally mounted at its one side end on the back lid 19 by a shaft 21a so that it is pivotally supported about the shaft 21a on the back lid 19. It should be noted that the roller plate 21 is urged in a clockwise direction by a spring (not shown) to press the first back lid roller 23 on the film feed roller 2. Also, a projection 21c is formed on the roller plate 21 at a position near the shaft 21a. This projection 21c functions as a stopper for the roller plate 21 when the back lid 19 is open. A second back lid roller 24 for guiding the film F is rotatably supported on a holder 25 which is fixed to the back lid 19. A cartridge retainer spring 26 is mounted on the back lid 19. This spring 26 is made of resilient material in the form of a thin plate. By utilizing its elasticity, the cartridge P is prevented from floating up or romping. A back lid opening-and-closing knob 27 is fixed as a unit to a back lid opening-and-closing lever 28. 29 is a light shielding member. A sprocket 30 for detection of the amount of fed film is driven to rotate in engagement with the perforations of the film F. Also, in FIG. 4, 56 is a finder eyepiece provided in the rear cover 15. 57 is a shutter release button.

Next, the operation of a camera of the construction of this embodiment will be explained, but the detailed construction of the constituent parts which have no direct concern with the present invention will be omitted. At first, as shown in FIG. 3, the back lid 19 is opened and the cartridge is set in the cartridge chamber 1a, while the leader of the film is placed on and beyond the tapered surface 15a. With the back lid 19 in the closed position, therefore, the leader is jutting out of the film admission passage 18 as shown in FIGS. 4 and 5. When the back lid 19 is closed, a lock mechanism therefor (not shown) is operated, and the jutting-out leader of film F advances toward the film admission passage 18 (FIG. 5), as rewinding in the automatic load mode is operated. Meanwhile, in the interior of the camera, as long as light issuing from the light emitting element 4 is blocked by the film F, the photosensitive element 6 determines that the film F is still passing above the light emitting element 4. Further movement of the film F will probably bring one of the penetration holes F1 into alignment with the light emitting element 4. If so, the light from the light emitting element 4 goes past the aligned penetration hole F1 to enter the light guide 5 in which it is reflected from the first reflection surface 5a to the second one 5b, and changes its course therefrom again toward the film F. Yet, the light exiting from the light guide 5 is blocked again by the film F, thus not reaching the photosensitive element 6. Hence, there is no possibility of mistaking the penetration hole F1 for the tip of the film leader. As the film F is further moved in the same direction, when its free end gets off the front of the light emitting element 4, the light from the light emitting element 4 can reach the photosensitive element 6. Responsive to this, a control circuit to be described later reverses the direction of rotation of the motor 9. Thus, the film F is now fed in the winding-up direction.

Figure 6:
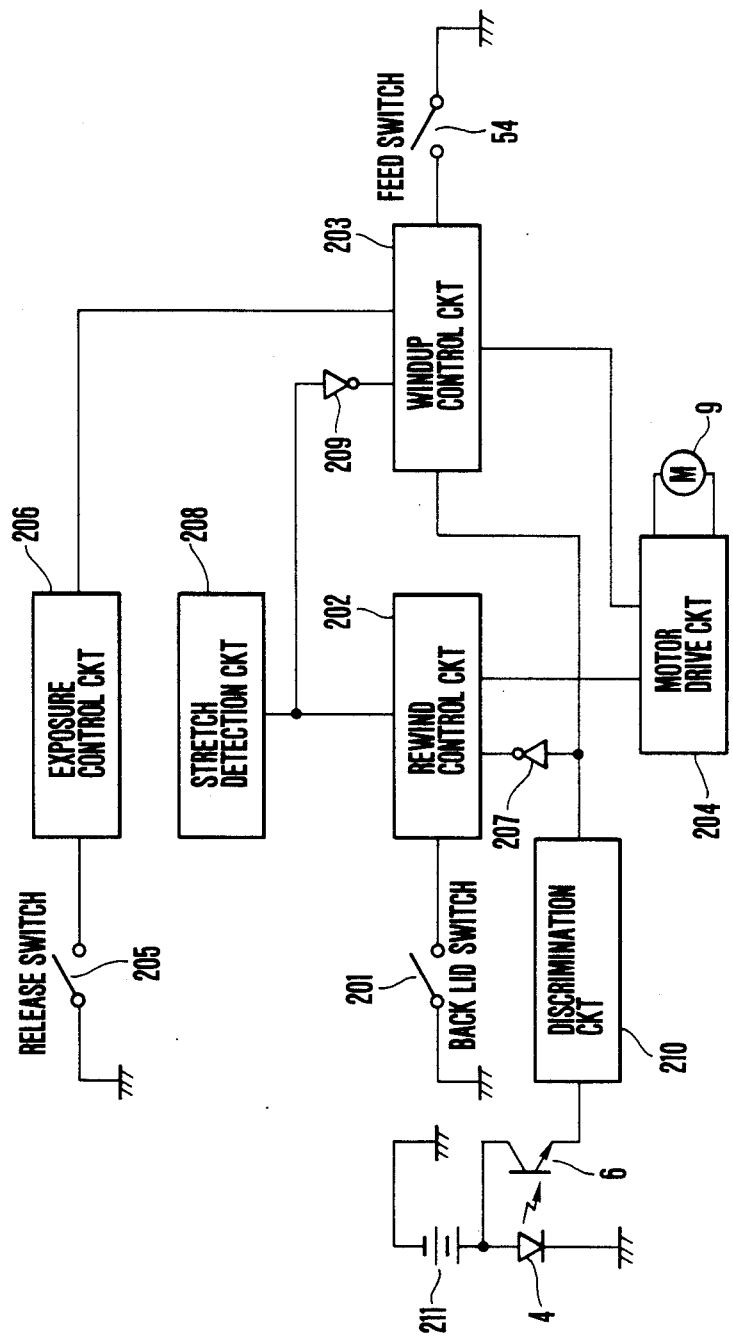
FIG. 6 is a block diagram of a control circuit of the same camera.
Figure 7:
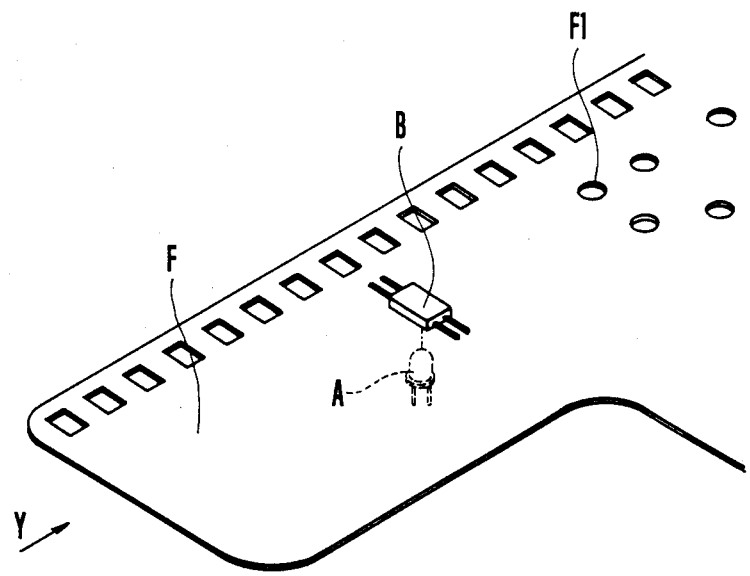
FIG. 7 is a perspective view illustrating the relationship between the film and the conventional device for detecting the free end of the film.
Figure 8:
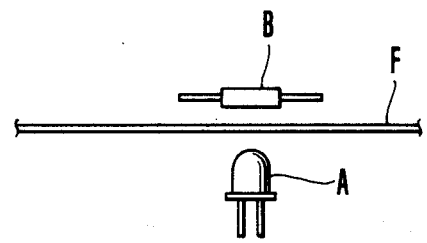
FIG. 8 is a side elevational view viewed from the direction of arrow Y of the device of FIG. 7.

FIG. 6 illustrates a block diagram of a control circuit to be applied to the above-described camera. A back lid switch 201 is arranged to turn off just when the back lid 19 has been closed. Reference numerals 4 and 6 are the before-mentioned light emitting and photosensitive elements respectively. When the film F is present between these two elements 4 and 6, the photosensitive element 6 is shuttered off. But, when the light path between these elements 4 and 6 is cleared of the film F, the photosensitive element 6 produces an output signal which is then applied to a discrimination circuit 210 for determining whether or not the inserting of the film F is complete. A rewind control circuit 202 controls the rewinding of film. A windup control circuit 203 controls the winding-up which is operated by the spool 8 and the film feed roller 2. A feed switch 54 for detecting the amount of advanced film is arranged adjacent the before-mentioned sprocket 30 for detecting the amount of fed film so that as the sprocket 30 rotates, it turns on and off repeatedly. The output of the feed switch 54 is connected to the windup control circuit 203. A motor drive circuit 204 is connected to both of the windup and rewind control circuits 202 and 203. By this, the reversing of the direction of rotation of the motor 9 is controlled. A stretch detection circuit 208 detects when the film F is stretched as it has been exposed to the last frame. The stretch detection circuit 208 is connected directly to the rewind control circuit 202 and also through an inverter 209 to the windup control circuit 203. Another inverter 207 is connected in the route from the discrimination circuit 210 to the rewind control circuit 202. A release switch 205 is arranged to turn on when the shutter release button 57 is pushed down, and connected to an exposure control circuit 206, which in turn is connected to the windup control circuit 203. Reference numeral 211 is an electrical power source.

Next, the operation of the control circuit of such construction is explained with reference to FIG. 6 again. At first, with the cartridge P loaded in the camera with the leader of film F left to jut out of the admission passage 18 as has been described above, when the back lid 19 is closed, the back lid switch 201 is turned off. Also, energization of the light emitting element 4 is started. But, because the film F intervenes between the two elements 4 and 6, the discrimination circuit 210 produces an output signal representing that fact. By this signal, the rewind control circuit 202 is actuated, producing an output signal which is applied to the motor drive circuit 204. The motor 9 then starts to rotate in the reverse or rewinding direction. Motion of the motor 9 is transmitted through an intermediary to a fork (not shown) in engagement with the supply spool in the cartridge P. Therefore, the jutting-out leading of film F is inserted into the camera. When the free end of film F has got off the front of the light emitting element 4, the photosensitive element 6 is struck with light, so that the discrimination circuit 210 determines that no film is present, or that the rewinding of the film F in the automatic loading mode is completed. Responsive to this detection, the inverter 207 de-actuates the rewind control circuit 202. At the same time, the windup control circuit 203 is actuated also by the output of the discrimination circuit 210, producing an output signal. Responsive to this signal, the motor drive circuit 204 changes the rotation of the motor 9 to the normal or winding direction. Therefore, the direction of movement of the film F is changed from rewinding to winding.

The winding-up operation is controlled by the windup control circuit 203 in such a manner that the first four frames of film F are fed as the blank frame advance sensed by the feed switch 54, while the fed portion of the film F is wound onto the takeup spool 8. After that, when the shutter release button 57 is pushed down, the release switch 205 is turned on to actuate the exposure control circuit 206. In a computed exposure time, the shutter (not shown) is closed. Then, the film is advanced one frame by the windup control circuit 203. When the film F in the cartridge P has all been exposed, the stretch detection circuit 208 produces an output signal representing the end of the film F, which is applied through the inverter 209 to de-actuate the windup control circuit 203. At the same time, the rewind control circuit 202 is actuated. Thus, the exposed film F wound onto the takeup spool 8 is returned back to the supply spool in the cartridge P.

Though the foregoing embodiment has been described with the light emitting and photosensitive elements disposed on the framework of the camera while the light guide is on the back lid, this may be reversed so that the light guide is positioned on the framework while to photoemitting and photosensitive elements are on the back lid. Another variation may be that the light emitting element is used in common with the lamp of a data imprinting device. Also, though, in the above-described embodiment, only one set of the light emitting and photosensitive elements and the light guide has been used, it is to be understood that the invention is not confined thereto. Two or more sets of them may be used. Further, instead of using the light guide, an additional pair or pairs of light emitting and photosensitive elements may be used. Furthermore, two light guides may be used on the opposite side of the film so that light circulates more than once.

As has been described above, the present invention is applied to a camera of the type which requires the photographer only to set a film cartridge in a chamber while leaving a film leader outside the camera housing when the cartridge chamber is closed. The film leader is automatically inserted into the camera housing and then advanced to a takeup spool onto which the film is wound. Pull-in means pull into the camera housing a part of the leader of film which has been left outside the camera housing. According to the present invention, optically operated detecting means have a light path arranged so that when the film leader is left outside the camera housing, it is cut by the film at least two points, and only when both points blocking the light path disappear, an output signal is produced that represents the completion of the insertion of the film leader into the camera housing. Winding means are responsive to the output signal for winding the film onto the takeup spool, thereby providing a great advantage in that the drawback which would otherwise result from the use of mechanically operated detecting means, (for example a contact switch, as in the prior art) is eliminated, without involving the alternative drawback that the optically operated detecting means is malfunction due to the penetration holes near the film leader.

Another advantage of the present invention is that, as shown in the above-described embodiment, the optically operated detecting means is made to include the light guide, and only one set of light emitting and receiving elements is necessary, thus providing a possibility of achieving a reduction of the production cost and a further improvement in miniaturization the camera.

What is claimed is:

1. In a camera having a cartridge chamber with film loaded therein, said film leaving a leader outside a camera housing after said housing is closed, said film leader being pulled into the camera housing and then being wound onto a spool, film winding apparatus comprising:
   (A) pull-in means for pulling the film leader into an interior of the camera housing;
   (B) optical detecting means including light path means arranged so that when the film leader is left outside the camera housing the film blocks the light path in a least two points separated from one another by a predetermined distance, said optical detecting means determining that the film leader is pulled into the camera housing upon detecting that said two points of the light path are no longer blocked; and
   (C) winding means, responsive to the detection by said optical detecting means for winding the film onto the spool.

2. A camera according to claim 1, wherein said optical detecting means includes light projecting means for projecting a signal light and light receiving means for receiving said signal light.

3. A camera according to claim 2, wherein said optical detecting means includes a light guide.

4. A camera according to claim 2, wherein said optical detecting means includes a light guide which receives said signal light from one side of a path of the film, transmits said signal light across another side of said film path, and projects said signal back to said one side of the film path.

5. A camera according to claim 4, wherein said light projecting means and said light receiving means are disposed on an opposite side of the film from said light guide, and wherein when the film is not present, said signal light projected from said light projecting element passes through said light guide impinge on said light receiving means.

6. In a camera having a film cartridge substantially containing a film, a portion of the film extending outside of the film cartridge remaining outside of the camera, and the film remaining outside of the film cartridge being retracted into the camera and fed to a film take-up spool, film winding apparatus comprising:
   (A) retracting means for retracting the film portion remaining outside of the film cartridge into the camera;
   (B) optical detection means for determining when the retraction of the film remaining outside of the film cartridge into the camera is complete by detecting that an optical path which is arranged to be shielded at least two points by the film when the film remaining outside of the film cartridge is outside the camera, is no longer shielded by the film.

7. A camera according to claim 6, wherein said optical detection means is so arranged that the two points of the optical path shielded by the film are in an almost perpendicular direction with respect to an advance direction of the film.

8. Apparatus for determining whether a film leader is inside or outside a camera housing, comprising:
   light emitting means, disposed in said camera housing on one side of a film path, for emitting signal light;
   light detection means, disposed in said camera housing on said one side of said film path, for detecting when the signal light is blocked by two separate portions of the film, and for detecting when the signal light is not blocked by said two film portions; and
   control means for emitting a control signal when said light detection means detects the signal light.

9. Apparatus according to claim 8, further including light guide means, disposed on the other side of said film path, for guiding the signal light from said light emitting means to said light detection means.

10. Apparatus according to claim 9, wherein said light guide means has a first end disposed adjacent one of said two film portions, and a second end disposed adjacent the other of said two film portions when the film portions block the signal light.

11. Apparatus according to claim 9, wherein said light guide means has a trapezoidal shape having first and second reflecting surfaces.

12. Apparatus according to claim 11, wherein said first reflecting surface is disposed adjacent one of said two film portions, and wherein said second reflecting surface is disposed adjacent the other of said two film portions when said film portions block said signal light.

13. Apparatus according to claim 9, wherein the film includes a plurality of holes therein, each hole having a longest dimension, and wherein said light guide means has first and second reflecting surfaces separated from one another by a distance greater than the film hole longest dimension.

14. Apparatus according to claim 9, wherein the film has a direction of advance, and wherein said light guide means is disposed in a direction perpendicular to said advance direction.

* * * * *

UNITED STATES PATENT AND TRADEMARK OFFICE
CERTIFICATE OF CORRECTION

PATENT NO. : 4,972,214
DATED : November 20, 1990
INVENTOR(S) : Yoshinobu SHIBAYAMA, et al.

It is certified that error appears in the above-identified patent and that said Letters Patent is hereby corrected as shown below:

ON TITLE PAGE:
AT [30] Foreign Application Priority Data:

Sep. 20, 1986 [JP] Japan . . . . 62-22707 should read --Sep. 20, 1986 [JP] Japan . . . . 62-222707--

AT [57] ABSTRACT

"predetermined" should read --a predetermined--.

COLUMN 1

Line 39, "film," should read --film--.
    Line 50, "present" should read --prevent--.
    Line 65, "moving," should read --moving--.

COLUMN 2

Line 7, "intruding" should read --insertion--.

COLUMN 3

Line 56, "contact on" should read --contact with--.

COLUMN 5

Line 24, "of film" should read --of the film--.
    Line 63, "leading" should read --leader--.

COLUMN 6

Line 33, "to" should read --the--.

UNITED STATES PATENT AND TRADEMARK OFFICE
CERTIFICATE OF CORRECTION

PATENT NO. : 4,972,214

DATED : November 20, 1990

INVENTOR(S) : Yoshinobu SHIBAYAMA, et al.

It is certified that error appears in the above-identified patent and that said Letters Patent is hereby corrected as shown below:

COLUMN 7

Line 1, "is malfunction" should read --malfunctions--.
    Line 9, "miniaturization the" should read --miniaturization of the--.
    Line 29, "means" should read --means,--.
    Line 33, "light and" should read --light, and--.
    Line 41, "said signal" should read --said signal light--.
    Line 47, "element" should read --means--.
    Line 48, "impinge" should read --to impinge--.

COLUMN 8

Line 8, "at least" should read --at at least--.
    Line 10, "film." should read --film; and feeding means for feeding the film toward the spool in response to the detection by said optical detection means of the complete retraction of the film portion into the film cartridge.--

Signed and Sealed this

Eighteenth Day of August, 1992

Attest:

DOUGLAS B. COMER

*Attesting Officer*      *Acting Commissioner of Patents and Trademarks*